United States Patent [19]
Shimazaki et al.

[11] Patent Number: 5,689,511
[45] Date of Patent: Nov. 18, 1997

[54] DATA RECEIVER FOR RECEIVING CODE SIGNALS HAVING A VARIABLE DATA RATE

[75] Inventors: Yoshihito Shimazaki; Kenichiro Hosoda, both of Tokyo, Japan

[73] Assignee: Oki Electric Industry Co., Ltd., Tokyo, Japan

[21] Appl. No.: 579,325

[22] Filed: Dec. 27, 1995

[30] Foreign Application Priority Data

Jan. 19, 1995 [JP] Japan .................. 7-006133

[51] Int. Cl.$^6$ ................ H04B 1/16; H04J 3/22
[52] U.S. Cl. ............ 370/545; 375/225; 375/341
[58] Field of Search ................ 370/252, 465, 370/514, 545; 375/222, 225, 316, 341, 343, 377, 200, 209

[56] References Cited

U.S. PATENT DOCUMENTS

| | | | |
|---|---|---|---|
| 3,775,751 | 11/1973 | Anderson | 370/545 |
| 3,842,399 | 10/1974 | Kneuer et al. | 370/545 |
| 5,008,902 | 4/1991 | Key et al. | 375/225 |
| 5,509,020 | 4/1996 | Iwakiri et al. | 375/341 |
| 5,563,910 | 10/1996 | Mellone et al. | 375/225 |
| 5,606,742 | 2/1997 | Kido | 370/514 |

OTHER PUBLICATIONS

TR45 Mobile Station–Base Station Compatibility Standard for Dual–Mode Wideband Spread Sprectrum Cellular System PN–3421 (to be published as IS–95–A)Ballot Version.

Primary Examiner—Hassan Kizou
Attorney, Agent, or Firm—Rabin, Champagne & Lynt, P.C.

[57] ABSTRACT

A data receiver receives code data having a variable data rate and encoded with any one of a plurality of data rates and then repeated in accordance with the respective data rates to be provided with the same data rate thereby, and restores, frame by frame, the received code data to data having original data rates. The receiver has a data rate detecting circuit which sequentially receives one frame of code data having the same data rate at a time, and detects the data rate of the code data assigned before the repetition. A data rate restoring circuit restores, based on the detected data rate, the frame of code data to the data having the original data rate. A data reproducing circuit reproduces the original signal out of the code data restored by the data rate restoring circuit. The data rate detecting circuit has a calculating circuit for calculating the autocorrelation functions of the frame of code data to thereby determine how many times the code data have been repeated, and a decision circuit for determining the data rate of the frame of code data assigned before the repetition on the basis of the characteristic of the data rate in the autocorrelation functions. The data rate restoring circuit and data reproducing circuit perform the respective processings on the basis of the determined data rate.

14 Claims, 10 Drawing Sheets

Fig. 4

INTERLEAVE INPUTS

| 1 | 25 | 49 | 73 | 97 | 121 | 145 | 169 | 193 | 217 | 241 | 265 | 289 | 313 | 337 | 361 |
| --- | --- | --- | --- | --- | --- | --- | --- | --- | --- | --- | --- | --- | --- | --- | --- |
| 2 | 26 | 50 | 74 | 98 | 122 | 146 | 170 | 194 | 218 | 242 | 266 | 290 | 314 | 338 | 362 |
| 3 | 27 | 51 | 75 | 99 | 123 | 147 | 171 | 195 | 219 | 243 | 267 | 291 | 315 | 339 | 363 |
| 4 | 28 | 52 | 76 | 100 | 124 | 148 | 172 | 196 | 220 | 244 | 268 | 292 | 316 | 340 | 364 |
| 5 | 29 | 53 | 77 | 101 | 125 | 149 | 173 | 197 | 221 | 245 | 269 | 293 | 317 | 341 | 365 |
| 6 | 30 | 54 | 78 | 102 | 126 | 150 | 174 | 198 | 222 | 246 | 270 | 294 | 318 | 342 | 366 |
| 7 | 31 | 55 | 79 | 103 | 127 | 151 | 175 | 199 | 223 | 247 | 271 | 295 | 319 | 343 | 367 |
| 8 | 32 | 56 | 80 | 104 | 128 | 152 | 176 | 200 | 224 | 248 | 272 | 296 | 320 | 344 | 368 |
| 9 | 33 | 57 | 81 | 105 | 129 | 153 | 177 | 201 | 225 | 249 | 273 | 297 | 321 | 345 | 369 |
| 10 | 34 | 58 | 82 | 106 | 130 | 154 | 178 | 202 | 226 | 250 | 274 | 298 | 322 | 346 | 370 |
| 11 | 35 | 59 | 83 | 107 | 131 | 155 | 179 | 203 | 227 | 251 | 275 | 299 | 323 | 347 | 371 |
| 12 | 36 | 60 | 84 | 108 | 132 | 156 | 180 | 204 | 228 | 252 | 276 | 300 | 324 | 348 | 372 |
| 13 | 37 | 61 | 85 | 109 | 133 | 157 | 181 | 205 | 229 | 253 | 277 | 301 | 325 | 349 | 373 |
| 14 | 38 | 62 | 86 | 110 | 134 | 158 | 182 | 206 | 230 | 254 | 278 | 302 | 326 | 350 | 374 |
| 15 | 39 | 63 | 87 | 111 | 135 | 159 | 183 | 207 | 231 | 255 | 279 | 303 | 327 | 351 | 375 |
| 16 | 40 | 64 | 88 | 112 | 136 | 160 | 184 | 208 | 232 | 256 | 280 | 304 | 328 | 352 | 376 |
| 17 | 41 | 65 | 89 | 113 | 137 | 161 | 185 | 209 | 233 | 257 | 281 | 305 | 329 | 353 | 377 |
| 18 | 42 | 66 | 90 | 114 | 138 | 162 | 186 | 210 | 234 | 258 | 282 | 306 | 330 | 354 | 378 |
| 19 | 43 | 67 | 91 | 115 | 139 | 163 | 187 | 211 | 235 | 259 | 283 | 307 | 331 | 355 | 379 |
| 20 | 44 | 68 | 92 | 116 | 140 | 164 | 188 | 212 | 236 | 260 | 284 | 308 | 332 | 356 | 380 |
| 21 | 45 | 69 | 93 | 117 | 141 | 165 | 189 | 213 | 237 | 261 | 285 | 309 | 333 | 357 | 381 |
| 22 | 46 | 70 | 94 | 118 | 142 | 166 | 190 | 214 | 238 | 262 | 286 | 310 | 334 | 358 | 382 |
| 23 | 47 | 71 | 95 | 119 | 143 | 167 | 191 | 215 | 239 | 263 | 287 | 311 | 335 | 359 | 383 |
| 24 | 48 | 72 | 96 | 120 | 144 | 168 | 192 | 216 | 240 | 264 | 288 | 312 | 336 | 360 | 384 |

Fig. 5

INTERLEAVE OUTPUTS

| 1 | 9 | 5 | 13 | 3 | 11 | 7 | 15 | 2 | 10 | 6 | 14 | 4 | 12 | 8 | 16 |
|---|---|---|---|---|---|---|---|---|---|---|---|---|---|---|---|
| 65 | 73 | 69 | 77 | 67 | 75 | 71 | 79 | 66 | 74 | 70 | 78 | 68 | 76 | 72 | 80 |
| 129 | 137 | 133 | 141 | 131 | 139 | 135 | 143 | 130 | 138 | 134 | 142 | 132 | 140 | 136 | 144 |
| 193 | 201 | 197 | 205 | 195 | 203 | 199 | 207 | 194 | 202 | 198 | 206 | 196 | 204 | 200 | 208 |
| 257 | 265 | 261 | 269 | 259 | 267 | 263 | 271 | 258 | 266 | 262 | 270 | 260 | 268 | 264 | 272 |
| 321 | 329 | 325 | 333 | 323 | 331 | 327 | 335 | 322 | 330 | 326 | 334 | 324 | 332 | 328 | 336 |
| 33 | 41 | 37 | 45 | 35 | 43 | 39 | 47 | 34 | 42 | 38 | 46 | 36 | 44 | 40 | 48 |
| 97 | 105 | 101 | 109 | 99 | 107 | 103 | 111 | 98 | 106 | 102 | 110 | 100 | 108 | 104 | 112 |
| 161 | 169 | 165 | 173 | 163 | 171 | 167 | 175 | 162 | 170 | 166 | 174 | 164 | 172 | 168 | 176 |
| 225 | 233 | 229 | 237 | 227 | 235 | 231 | 239 | 226 | 234 | 230 | 238 | 228 | 236 | 232 | 240 |
| 289 | 297 | 293 | 301 | 291 | 299 | 295 | 303 | 290 | 298 | 294 | 302 | 292 | 300 | 296 | 304 |
| 353 | 361 | 357 | 365 | 355 | 363 | 359 | 367 | 354 | 362 | 358 | 366 | 356 | 364 | 360 | 368 |
| 17 | 25 | 21 | 29 | 19 | 27 | 23 | 31 | 18 | 26 | 22 | 30 | 20 | 28 | 24 | 32 |
| 81 | 89 | 85 | 93 | 83 | 91 | 87 | 95 | 82 | 90 | 86 | 94 | 84 | 92 | 88 | 96 |
| 145 | 153 | 149 | 157 | 147 | 155 | 151 | 159 | 146 | 154 | 150 | 158 | 148 | 156 | 152 | 160 |
| 209 | 217 | 213 | 221 | 211 | 219 | 215 | 223 | 210 | 218 | 214 | 222 | 212 | 220 | 216 | 224 |
| 273 | 281 | 277 | 285 | 275 | 283 | 279 | 287 | 274 | 282 | 278 | 286 | 276 | 284 | 280 | 288 |
| 337 | 345 | 341 | 349 | 339 | 347 | 343 | 351 | 338 | 346 | 342 | 350 | 340 | 348 | 344 | 352 |
| 49 | 57 | 53 | 61 | 51 | 59 | 55 | 63 | 50 | 58 | 54 | 62 | 52 | 60 | 56 | 64 |
| 113 | 121 | 117 | 125 | 115 | 123 | 119 | 127 | 114 | 122 | 118 | 126 | 116 | 124 | 120 | 128 |
| 177 | 185 | 181 | 189 | 179 | 187 | 183 | 191 | 178 | 186 | 182 | 190 | 180 | 188 | 184 | 192 |
| 241 | 249 | 245 | 253 | 243 | 251 | 247 | 255 | 242 | 250 | 246 | 254 | 244 | 252 | 248 | 256 |
| 305 | 313 | 309 | 317 | 307 | 315 | 311 | 319 | 306 | 314 | 310 | 318 | 308 | 316 | 312 | 320 |
| 369 | 377 | 373 | 381 | 371 | 379 | 375 | 383 | 370 | 378 | 374 | 382 | 372 | 380 | 376 | 384 |

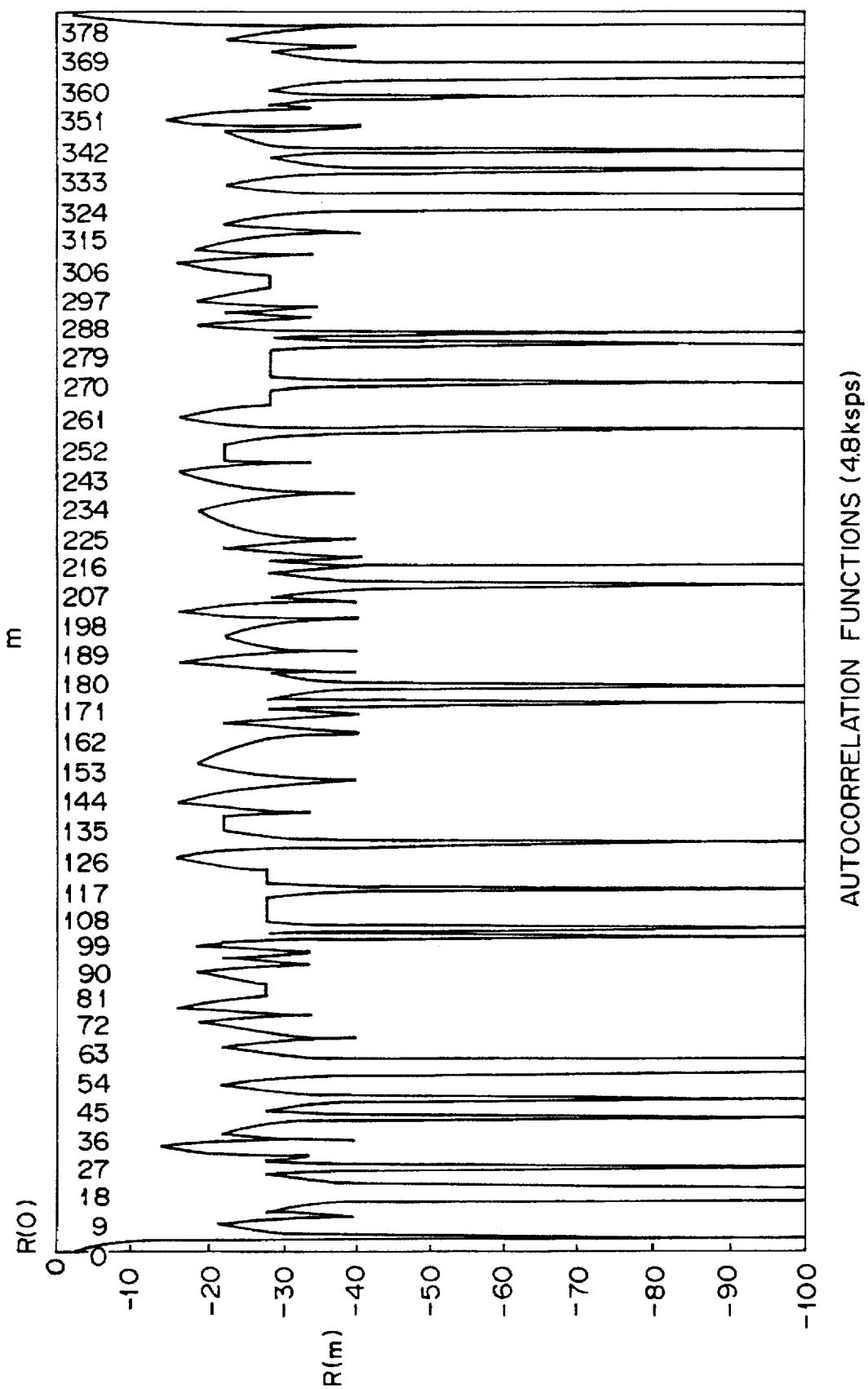
Fig. 10  AUTOCORRELATION FUNCTIONS (4.8ksps)

DATA RECEIVER FOR RECEIVING CODE SIGNALS HAVING A VARIABLE DATA RATE

BACKGROUND OF THE INVENTION

1. Field of the Invention

The present invention relates to a data receiver for receiving code signals having a variable data rate and, more particularly, to a data receiver advantageously applicable to, e.g., a CDMA (Code Division Multiple Access) mobile communication system.

2. Description of the Background Art

Recently, the Telecommunication Industry Association (TIA) of US has proposed compatibility standards for cellular mobile communication systems and has already standardized, e.g., a CDMA cellular system as TIA/EIA/IS-95. This standardized cellular system encodes speech signals while varying the code rate in matching relation to the caller's speech rate. With such a variable data rate encoding scheme, it is possible to increase the transmission efficiency of speech signals and, therefore, the system capacity which determines the frequency utilization efficiency.

For the above variable data rate encoding scheme, use is made of, e.g., a system called QCELP (Qualcomm Codebook Excited Linear Prediction) covering a speech band. The QCELP system or encoder outputs consecutive frames of speech data each having a particular transmission rate matching the ratio of the duration of voice, i.e., a speech duty ratio. Generally, the speech duty ratio particular to a human speech is about one-third of the rate at which the speech is spoken. Paying attention to this fact, the QCELP system assigns sixteen-bit, forty-bit, eighty-bit or 172-bit code data to a single frame format which is 20 milliseconds long. As a result, the sixteen-bit frame data, forty-bit frame data, eighty-bit frame data and 172-bit frame data are output from a speech decoder with transmission rates of 0.8 kbps (kilobits per second), 2.0 kbps, 4.0 kbps, and 8.6 kbps, respectively.

Among the encoded speech data, only the 8.6 kbps speech data and 4.0 kbps speech data are given a CRC (Cyclic Redundancy Check) code which is a quality indicator, and respectively turn out 9.2 kbps code data and 4.4 kbps code data. Subsequently, tail bits are added to the end of each frame of code data, so that all the data will be converged to the same condition when decoded at a data receiver. As a result, the frames of code data are each provided with one of code rates of 1.2 kbps, 2.4 kbps, 4.8 kbps, and 9.6 kbps.

Each frame of code data with tail bits are subjected to trellis coding using a convolutional code having, e.g., a code rate of ½ and a constraint length of 9. Consequently, the data of the respective rates turn out symbols to be transmitted and each having a doubled number of bits. Specifically, the code data having the rate of 1.2 kbps are reconstructed to have a code rate of 2.4 ksps (symbols per second). Likewise, the code data having the rate of 2.4 kbps are reconstructed to have a code rate of 4.8 ksps. Further, the 4.8 kbps data and 9.6 kbps data are reconstructed to have code rates of 9.6 ksps and 19.2 ksps, respectively.

The data subjected to the above convolutional encoding have their symbols repeated in accordance with the respective code rates and are provided with the same transmission rate thereby. Specifically, the 2.4 ksps data each has its symbol repeated eight consecutive times to obtain a transmission rate of 19.2 ksps. The 4.8 ksps data each has its symbol repeated four times to obtain the transmission rate of 19.2 ksps. Further, the 9.6 ksps data each has its symbol repeated two times to obtain the transmission rate of 19.2 ksps while the 19.2 ksps data each has its symbol repeated one time. That is, the 19.2 ksps data are directly fed to the following stage at the rate of 19.2 ksps without being repeated.

At the following stage, the code data given the same rate of 19.2 ksps have their bits rearranged on a frame basis, or block interleaved, in a matrix type memory. For example, each frame of data are sequentially written to the columns of a 16 (rows)×24 (columns) memory and then sequentially read out of the rows of the memory in a preselected order. The order in which the rows are read out differs from an up-going signal sent from a mobile station to a base station to a down-going signal sent from a base station to a mobile station.

The interleaved frame data are spread by use of a long PN code or similar false noise, provided with, e.g., 800 bps power control bits produced by a similar procedure, and then subjected to orthogonal transform using, e.g., Walsh functions. By the orthogonal transform, every six symbols, for example, of each interleaved code data are converted to sixty-four-bit Walsh symbol. As a result, all the data are provided with a transmission rate of 1.2288 Mcps (megachips per second). The resulting signal is divided into two phases and then subjected to orthogonal transform using an OQPSK (Offset Qudarature Phase Shift Keying) scheme and a short PN code or similar pilot false random number sequence. The modulated signals, spread in spectrum with the pilot false random number sequence, are mixed, and each is superposed on a carrier and then sent.

At the data receiver, a signal coming in through an antenna is demodulated by a high-frequency demodulator and then down-converted to a 1.2288 Mcps signal. The down-converted signal is multiplied by false noise identical with the short PN code used at the transmitter and inversely spread in spectrum thereby. The inversely spread signal is passed through, e.g., an FIR (Finite Impulse Response) filter so as to separate a signal of a preselected channel, i.e., a signal meant for the station including the receiver. Subsequently, the inversely spread signal is separated into the code data and the power control bits by a demultiplexer. The power control bits are fed to a power control circuit and used to control the transmission power of the station. On the other hand, the code data are multiplied by false noise identical with the long PN code used at the transmitter, whereby the Walsh symbols are reproduced. The Walsh symbols are subjected to inverse orthogonal transform by the same Walsh functions as used at the transmitter, and restored to a 19.2 ksps baseband signal.

The baseband signal is rearranged, or deinterleaved, by a procedure opposite to the interleave procedure executed at the transmitter. The deinterleaved code data are once written to a data buffer and then thinned or reduced in number. To thin the data, each symbol may be accumulated the same number of times as it was repeated at the transmitter. This successfully provides the original data rate to the code data. As a result, the symbols having the data rate of 19.2 ksps are each reproduced as a symbol whose rate is 2.4 ksps, 4.8 ksps, 9.6 ksps, or 19.2 ksps. After the thinning step, each symbol is decoded by Viterbi decoding in accordance with the rate of convolutional encoding executed at the transmitter, thereby regaining the rate of 0.8 kbps, 2.0 kbps, 4.4 kbps, or 9.2 kbps. The 0.8 kbps data and 2.0 kbps data are directly applied to a vocoder as they are. On the other hand, the 4.4 kbps data and 9.2 kbps data have their CRC bits checked for error detection and then have the CRC bits removed. The 4.4 kbps data and 9.2 kbps data undergone error checking are applied to the vocoder as data having data rates of 4.0 kbps and 8.6 kbps, respectively. The vocoder decodes each input data at the code rate particular thereto. Consequently, the speech data of variable data rate are reproduced as the original speech signals.

However, the problem with the conventional system is that a code or the like for the identification of a transmission rate is not added to the code data of variable data rate, even TIA/EIA/IS-95 has not prescribed any identification scheme yet. It has been customary with the above system to equip the receiver with a data buffer capable of storing, e.g., at least two frames of deinterleaved symbols. With the data buffer, the receiver decodes a frame written first while writing the following frame. Specifically, the receiver estimates a certain data rate and then decodes the received data on the basis of the estimated data rate, often consuming a substantial period of time. This is why the receiver needs a data buffer having the above capacity.

More specifically, the receiver estimates one of one time, two times, four times and eight times of repeated addition for thinning, reproduces symbols of certain rate, and then Viterbi-decodes the reproduced symbols. If the received data cannot be accurately decoded, the receiver changes the number of times of addition and again decodes symbols of another rate. In the worst case, therefore, the receiver must repeat the decoding process four consecutive times. As a result, the received data must be held until the data rate of the baseband signal of the received data has been identified. This results in the need for the data buffer capable of accommodating two frames of symbols, as stated above, and thereby prevents the receiver from having an inexpensive and miniature configuration.

SUMMARY OF THE INVENTION

It is, therefore, an object of the present invention to provide an inexpensive, miniature and efficient data receiver capable of identifying the code rate of received data and decoding the data at an adequate rate without resorting to a data buffer or a plurality of decoding circuits.

A data receiver of the present invention receives code data having a variable data rate and encoded with any one of a plurality of data rates and then repeated in accordance with the respective data rates to be provided with the same data rate thereby, and restores, frame by frame, the received code data to data having original data rates. The receiver has a data rate detecting circuit which sequentially receives one frame of code data having the same data rate at a time, and detects the data rate of the code data assigned before the repetition. A data rate restoring circuit restores, based on the detected data rate, the frame of code dam to the data having the original data rate. A data reproducing circuit reproduces the original signal out of the code data restored by the data rate restoring circuit. The data rate detecting circuit has a calculating circuit for calculating the autocorrelation functions of the frame of code data to thereby determine how many times the code data have been repeated, and a decision circuit for determining the data rate of the frame of code data assigned before the repetition on the basis of the characteristic of the data rate in the autocorrelation functions. The data rate restoring circuit and data reproducing circuit perform the respective processings on the basis of the determined data rate.

BRIEF DESCRIPTION OF THE DRAWINGS

The objects and features of the present invention will become more apparent from the consideration of the following detailed description taken in conjunction with the accompanying drawings in which:

FIG. 4 is a table listing specific code data written to an interleave memory included in the transmitter of FIGS. 2 and 3;

FIG. 5 is a table listing the code data read out of the interleaved memory;

FIG. 10 shows specific autocorrelation functions of frame data also received in the alternative embodiment, but having the data rate of 4.8 ksps.

DESCRIPTION OF THE PREFERRED EMBODIMENTS

Figure 1:
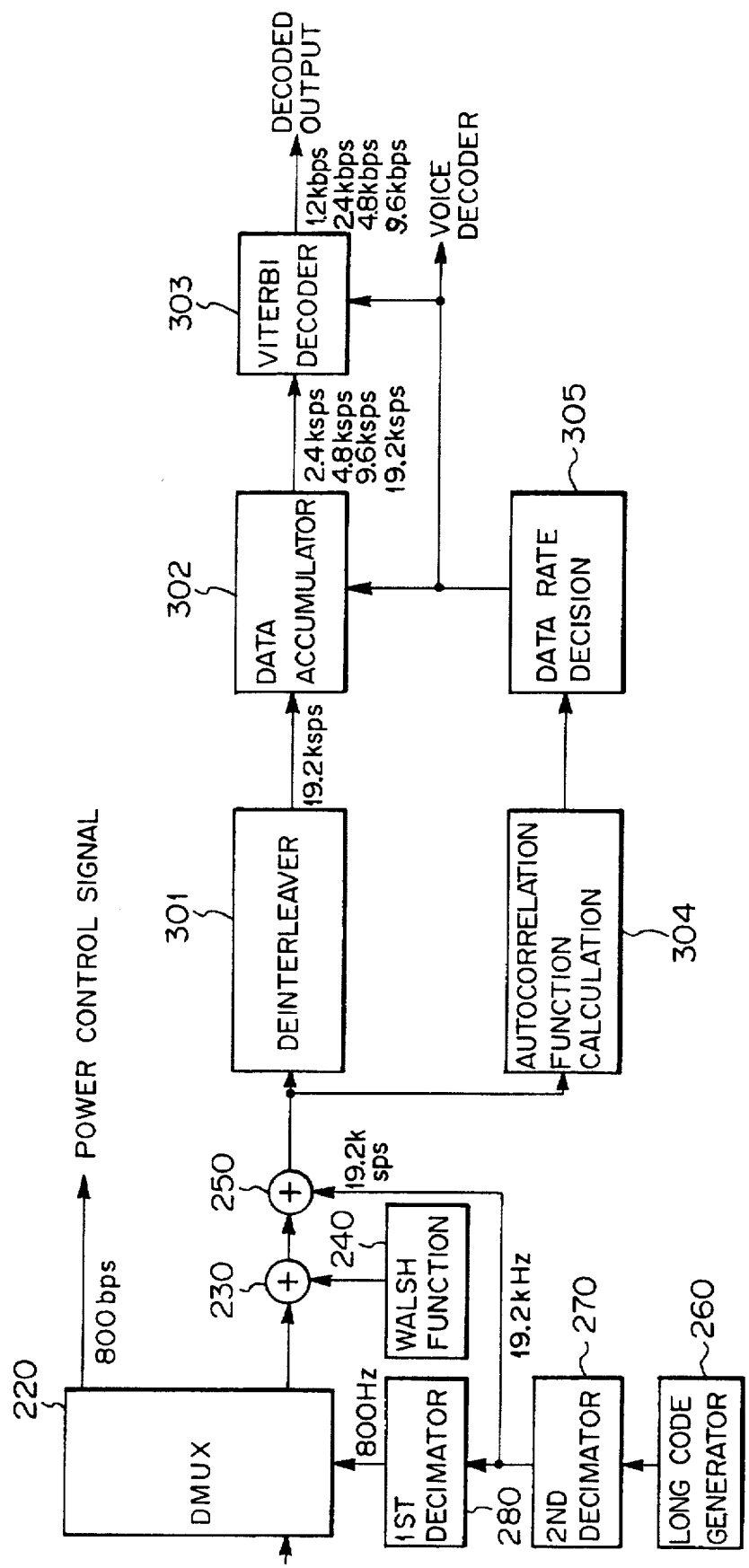
FIG. 1 is a block diagram schematically showing a data receiver embodying the present invention.
Figure 2:
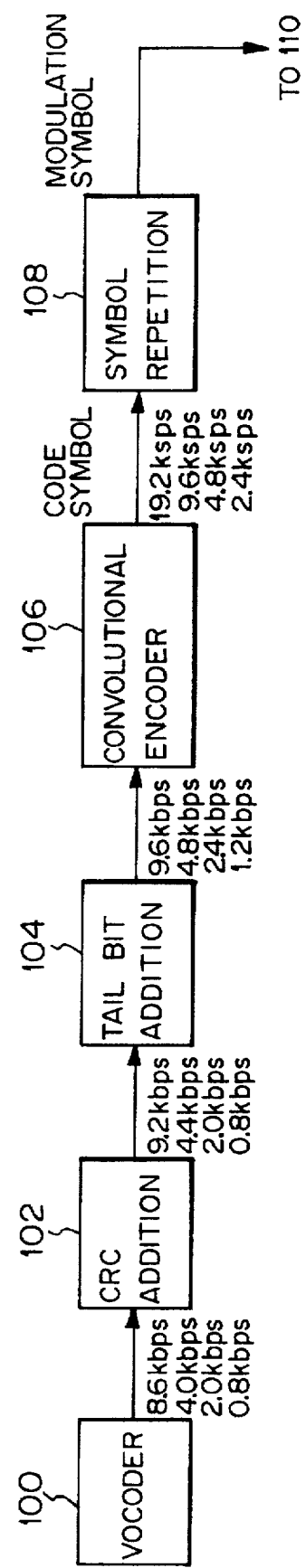
FIGS. 2 and 3 are block diagrams schematically showing a data transmitter applicable to the embodiment.
Figure 3:
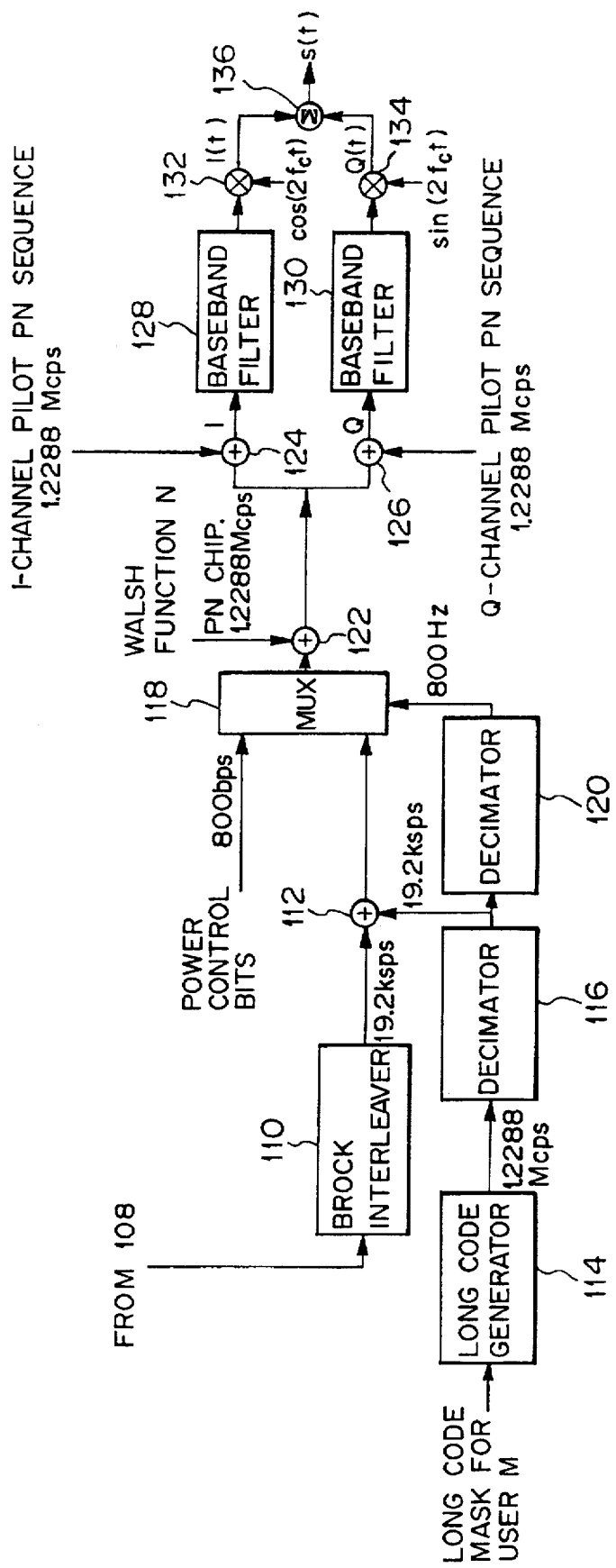

Referring to FIG. 1 of the drawings, a data receiver embodying the present invention is shown and advantageously applicable to, e.g., a cellular mobile communication system. The data receiver receives a coded signal having a variable data rate from a CDMA data transmitter which is shown in FIGS. 2 and 3. The receiver effectively determines the data rates of the received data on the basis of an autocorrelation function particular to the data, thereby adequately reproducing data with a single decoding step without resorting to a plurality of memories. Particularly, as shown in FIG. 1, the embodiment includes an autocorrelation function calculation 304 for calculating, frame by frame, the autocorrelation functions of the received data before the data are applied to a deinterleaver 301. A data rate decision 305 determines data rates on the basis of the calculated autocorrelation functions. A data accumulator 302 and a Viterbi decoder 303 decode the data with effective data rates in response to the outputs of the data rate decision 305.

To better understand the format of code data which the embodiment receives, a system for transmitting the data will be described with reference to FIGS. 2 and 3. As shown, a data transmitter has, e.g., a vocoder 100 for transforming speech signals to code data having a variable data rate. The vocoder 100 may advantageously be implemented by the previously stated QCELP encoder. The code data are each assigned to a 20-millisecond-long frame format as sixteen-bit, forty-bit, eighty-bit or 172-bit code data, depending on the speech rate. The sixteen-, forty-, eighty- and 172-bit coded data are fed to a CRC (Cyclic Redundancy Code) addition 102 at transmission rates of 0.8 kbps, 2.0 kbps, 4.0 kpbs, and 8.6 kpbs, respectively.

The CRC addition 102 calculates a CRC code for error correction with a predetermined calculation scheme and adds it to the data output from the vocoder 100. In the illustrative embodiment, the CRC addition 102 adds, e.g., a twelve-bit CRC code to, among the 0.8 kbps through 4.0 kbps code rate data, the 2.0 kbps and 4.0 kbps code rate data.

The resulting output of the CRC addition 102 has a rate of 0.8 kbps, 2.0 kbps, 4.4 kbps or 9.2 kbps and is applied to a tail bit addition 104.

The tail bit addition 104 adds to each input data from the CRC addition 102 a predetermined code representative of the end of a frame, e.g., eight all-zero tail bits. The output of the addition 104 is fed to a convolutional encoder 106 with a rate of 1.2 kbps, 2.4 kbps, 4.8 kbps or 9.6 kbps.

The convolutional encoder 106 convolutionally encodes each bit of the data input from the addition 104 by using a predetermined algorithm, thereby outputting two-bit one-symbol codes. For example, the encoder 106 transforms each input data to a convolutional code symbol with a coding rate of ½ and a constraint length of 9. The code data from the encoder 130 are applied to a symbol repetition 108 with a rate of 2.4 ksps (kilosymbols per second), 4.8 ksps, 9.6 ksps or 19.2 ksps.

The symbol repetition 108 repeats each symbol input from the encoder 106 at a particular rate matching the rate of the symbol, thereby providing the same rate to all the data. For example, the repetition 108 repeats the 2.4 ksps signal eight times symbol by symbol, repeats the 4.8 ksps rate signal four consecutive times, repeats the 9.6 ksps signal two times, and repeats the 19.2 ksps signal one time, thereby providing all the signals with the same rate of 19.2 ksps. The data encoded by the above procedure are fed to a block interleaver 110 frame by frame with the rate of 19.2 ksps.

The block interleaver 110 has, e.g., a 16 (rows)×24 (columns) frame memory. The interleaver 110 sequentially writes one frame of input 19.2 ksps rate data, i.e., 384-bit frame data in the consecutive columns of the memory, as shown in FIG. 4 specifically. Also, the interleaver 110 reads the data out of the memory in a particular order, as shown in FIG. 5 specifically. As a result, the bits of one frame of data are rearranged. The data output from the interleaver 110 are added to a long PN code or similar false noise by an adder 112.

Specifically, the false noise is fed from a long code generator 114 to the adder 112 via a first decimator 116. The long code generator 114 is a false noise generator set on a user basis for data spreading, and capable of generating, e.g., a 1.2288 Mcps long PN code. The first decimator 116 transforms the long PN code to a 19.2 ksps code. The code data added to the false noise by the adder 112 are applied to a multiplexer (MUX) 118.

The MUX 118 adds power control bits to the code data output from the adder 112. The MUX 118 adds to the power control bits false noise fed from a second decimator 120, thereby outputting a spread code. Specifically, the decimator 120 generates noise having a frequency of 800 Hz out of the 19.2 ksps long PN code fed from the decimator 120. The code data with the power control bits are applied to an adder 122.

The adder 122 adds a Walsh function to each data output from the MUX 118. Walsh functions are orthogonal transform functions used to orthogonally transform, channel by channel, the data input from the MUX 118 with a predetermined group of codes. For example, the adder 122 orthogonally transforms every six symbols of the data with a sixty-four-bit Walsh function and thereby transforms the data to a code rate of 1.2288 Mcps. The data subjected to the Walsh transform are modulated by an OPSK (Offset Pulse Shift Keying) modulator and then sent via an antenna.

The OPSK modulator divides the Walsh transformed data into I-phase data and Q-phase data. An adder 124 adds the I-phase data to 1.2288 Mcps pilot false noise while an adder 126 adds the Q-phase data to pilot false noise different from the false noise assigned to the I phase. As a result, the I-phase and Q-phase data are subjected to spectrum spread. The spread data from the adders 124 and 126 are respectively routed through baseband filters 128 an 130 to multipliers 132 and 134. The multiplier 132 is a modulator for multiplying the I-phase data input from the filter 128 by a cos(2fct) carrier. On the other hand, the multiplier 134 multiplies the Q-phase data input from the filter 130 by a sin(2fct) carrier. The multiplied I- and Q-phase data are mixed by a mixer 136 and then radiated via the antenna.

The data receiver embodying the present invention and constructed to receive code data from the above transmitter will be described with reference to FIG. 1. It is to be noted that FIG. 1 shows only an essential part of the receiver for demodulating and decoding a received signal undergone high-frequency demodulation and from which the carrier has been removed. In the embodiment, a high-frequency demodulator, not shown, removes the carrier from the received signal. False noise identical with a short PN code used in the transmitter is added to the signal output from the high-frequency demodulator. The resulting signal is separated by signals of other channels by, e.g., a filter. As a result, code data including 1.2288 Mcps power control bits are applied to a demultiplexer (DMUX) 220.

The DMUX 220 separates the power control bits from the 1.2288 Mcps received data. A first decimator 280 feeds to the DMUX 220 false noise identical with the 800 Hz long PN code used in the transmitter. The MUX 220 adds the false noise to the power control bits located at the predetermined positions of the frames, thereby reproducing the original control bits. The reproduced control bits are applied to a power control circuit, not shown. At the same time, the code data from which the power control bits have been removed are fed to a first adder 230. The adder 230 adds Walsh codes identical with the Walsh functions 240 used in the transmitter to the coded data so as to subject the data to inverse orthogonal transform. The data output from the adder 230 again have a symbol rate of 19.2 ksps and are applied to a second adder 250.

The second adder 250 adds false noise identical with the 19.2 long PN code used in the transmitter to the coded data restored to the rate of 19.2 ksps, so that the data are inversely spread. The long PN code is generated by a long code generator 260 similar to the long code generator 114, FIG. 3, and fed to the adder 250 via a second decimator 270 as false noise. Consequently, the outputs of the adder 250 are each representative of a particular bit of the code data identical with the 19.2 ksps data interleaved at the transmitter. For example, the adder 250 outputs 384-bit frame data in the order shown in FIG. 5. The code data regained the condition given before the interleaving are delivered to a deinterleaver 301 and an autocorrelation function calculation 304.

The deinterleaver 301, like the interleaver 110 of the transmitter, is implemented by a 16 (rows)×24 (columns) frame memory by way of example. The deinterleaver 301 restores the data sequence fed from the adder 250 to a symbol sequence having the original arrays of FIG. 4 by deinterleaving which is opposite to interleaving in order. The frame data output from the deinterleaver 301 and having the original symbol sequence are fed to a data accumulator 302.

The data accumulator 302 reproduces the code signal of the original variable data rate by, e.g., repeatedly accumulating each bit of the deinterleaved symbol sequence the same number of times as the bit was repeated at the transmitter. In this sense, the data accumulator 302 plays the role of a data rate converting circuit. In the illustrative embodiment, the data accumulator 302 determines how many times it should repeat the addition in response to the output of a data rate decision 305, because the number of times of repetition executed is not indicated by the deinterleaved symbol sequence.

The data rate decision 305 determines a data rate on the basis of autocorrelation functions fed thereto from the autocorrelation function calculation 304. The determined data rate is fed from the decision 305 to the data thinning 302 and a Viterbi decoder 303. The calculation 304 produces the autocorrelation functions or values R(m) of the non-interleaved frame data by use of the following equation:

$$R(m) = \sum_{N=0}^{N-1} x(n) \cdot X(n+m) \quad (m = 0, 1, \ldots, N-1) \quad \text{Eq. (1)}$$

where X(n) is the characteristic function of the frame data and represented by n of N data. As the Eq. (1) indicates, the calculation 304 produces a product of the characteristic function X(n) and a function X(n+m) remote from X(n) by m data, totalizes such products while sequentially changing the variable m from 0 to (N−1), and thereby produces autocorrelation values R(0) through R(N−1) at the respective data positions. For example, in the code data to be received by the receiver of the embodiment, each frame of data having one of the data rates of 2.4 ksps, 4.8 ksps, 9.6 ksps and 19.2 ksps have their bits repeated a predetermined number of times based on the data rate, and then rearranged in a predetermined order. Hence, some autocorrelation is expected to appear in the data, depending on the number of times of repetition. Although the 19.2 ksps rate data are not repeated at all and may even by fully random, such data are still symmetrical with respect to the values R(0) because the autocorrelation function of Eq. (1) is determined with all the symbols of one frame, as follows:

$$R(0)$$
$$R(1) = R(N-1)$$
$$R(2) = R(N-2)$$
$$\vdots$$
$$\vdots$$
$$\quad \text{Eq. (2)}$$

Figure 6:
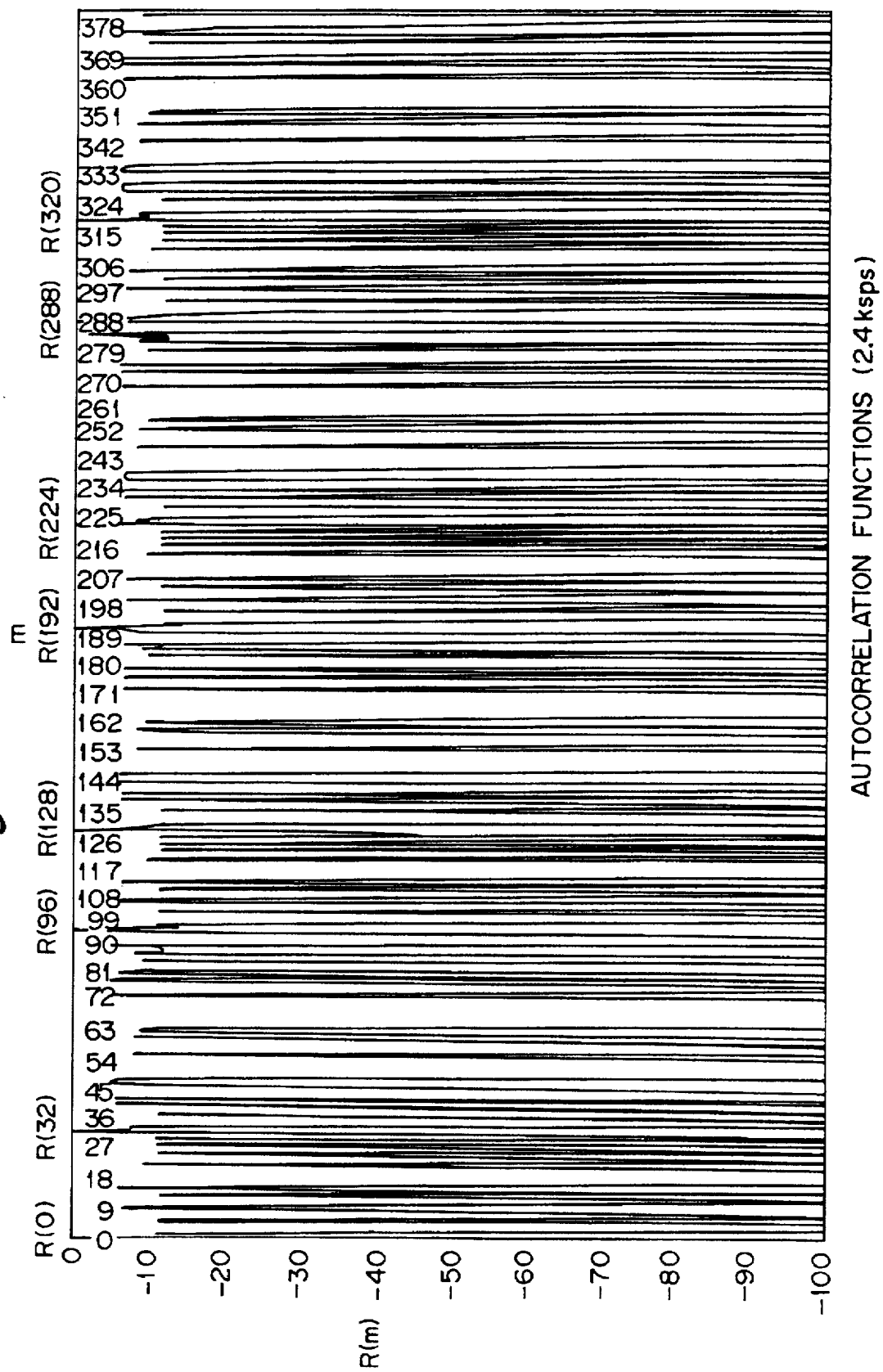
FIG. 6 shows specific autocorrelation functions of frame data received in the embodiment and having the original data rate of 2.4 ksps.
Figure 7:
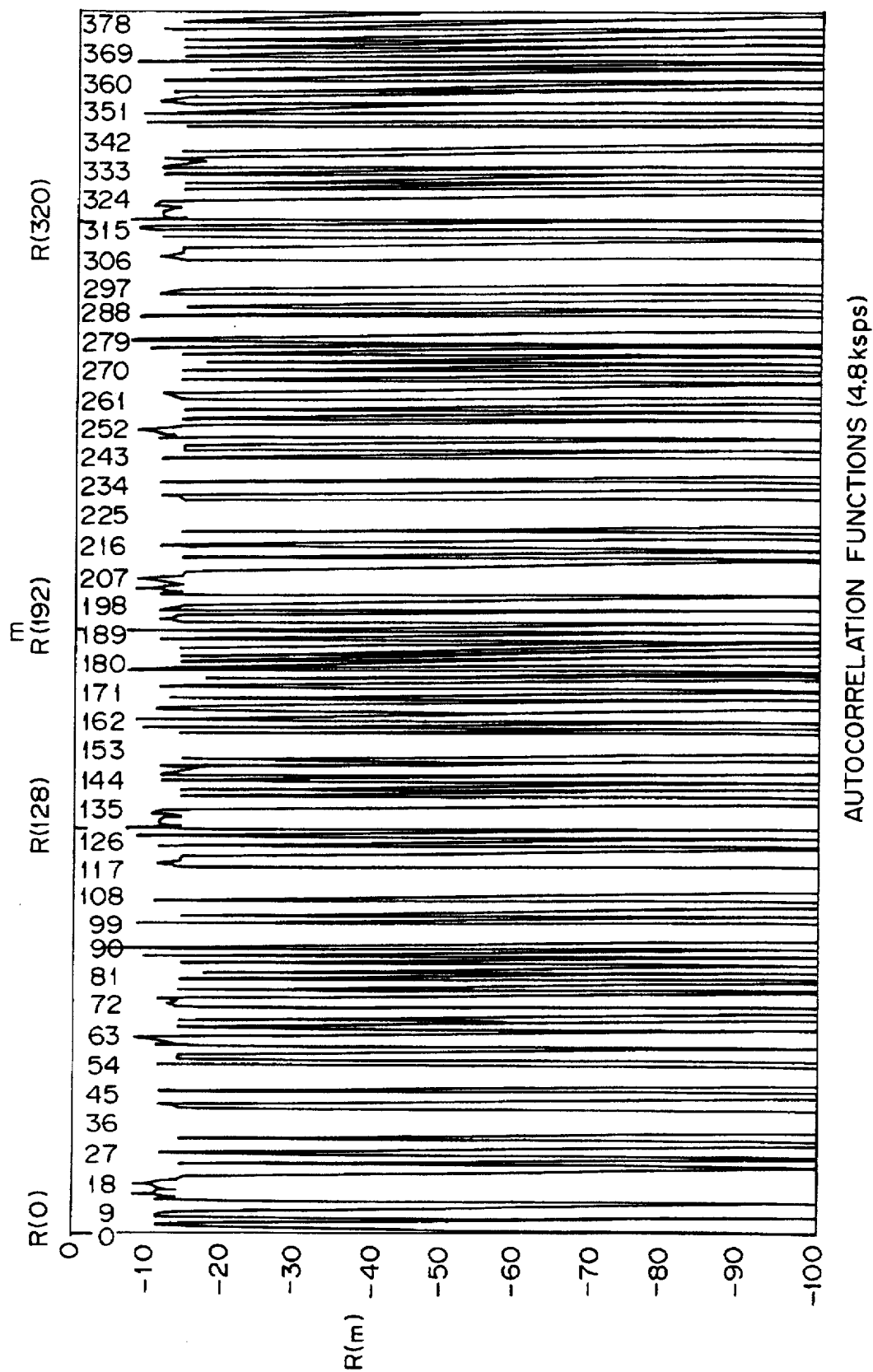
FIG. 7 shows specific autocorrelation functions of frame data also received in the embodiment but having the original data rate of 4.8 ksps.

Particularly, when the number of times of repetition effected at the transmitter is great, many portions of one frame of data are expected to be representative of an autocorrelation. For example, FIGS. 6 and 7 respectively show the autocorrelation values R(0) through R(384) of one frame of data having the original data rate of 2.4 ksps and repeated eight times, and the autocorrelation values R(0) through R(384) of one frame of data having the original data rate of 4.8 ksps and repeated four times. In these figures, the abscissa is representative of the variable m of the autocorrelation values R(m) while the ordinate is representative of the values R(m) in terms of logarithm. In FIG. 6, the autocorrelation function reaches a peak value or maximum value of "0" at R(0), R(32), R(96), R(128), R(192), R(224), R(288), and R(320), i.e., at eight points in total. Likewise, in FIG. 7, the autocorrelation function has a peak value at R(0), R(128), R(192), and R(320). It is to be noted that the 9.6 ksps rate frame data and 19.2 ksps rate frame data respectively have two peak values and a single peak value, although not shown specifically.

The autocorrelation values R(m) produced by the calculation 304 are sequentially applied to the data rate decision 305. The decision 305 counts the peak values included the input values (Rm) and thereby determines the data rate of the code data. The data rate is fed from the decision 305 to the data thinning 302 in order to set the number of times of addition to be effected by the thinning 302. In response, the thinning 302 restores each code data to the symbols of original coding rate by repeating addition the set number of times. The symbols are applied to the Viterbi decoder 303.

The Viterbi decoder 303 decodes the thinned data or symbols output from the data accumulator 302 by use of a predetermined algorithm. Specifically, the decoder 303 decodes the two-bit one-symbol data to the original one-bit data at the same rate as the encoding rate, e.g., ½ particular to the convolutional coding executed at the transmitter. The decoded data have their tail bits removed. Among the resulting data, the 9.6 kbps data and 4.8 kbps data are subjected to error checking based on the CRC code. Finally, the data are fed to a speech decoding section, not shown. In the illustrative embodiment, the speech decoding section is also comprised of a QCELP decoder and reproduces the original speech signals in accordance with the respective data rates.

The data receiver having the above configuration is operated as follows. The transmitter built in, e.g., a base station sends a modulated signal to the receiver over a traffic channel. The modulated signal is received by the antenna of the receiver built in, e.g., a mobile station. First, the receiver executes high-frequency demodulation with the received signal in order to remove a carrier fc therefrom. As a result, an intermediate frequency (IF) signal having a data rate of 1.2288 Mcps is produced. The short PN code used in the transmitter is added to the IF signal. The IF signal with the short PN code is passed through, e.g., a filter to be inversely spread thereby. Consequently, the data meant for the receiver are separated from the data of other channels and applied to the DMUX 220.

The DMUX 220 adds the long PN code output from the first decimator 280 to power control bits located at the predetermined positions of the input data, thereby reconstructing the original signal. This signal is separated from code data and then applied to the power control circuit. On the other hand, the code data are sequentially fed to the adder 230. The adder 230 adds a Walsh code output from the Walsh function 230 to each of the incoming data. As a result, the code data are subjected to inverse orthogonal transform and transformed to a baseband signal having the rate of 19.2 ksps thereby.

Subsequently, the adder 250 adds the 19.2 kHz long PN code fed thereto from the second decimator 270 to the code data or baseband signal, thereby inversely spreading the data. The inversely spread data or frame data are applied to the deinterleaver 301 and autocorrelation function calculation 304. In response, the calculation 304 calculates an autocorrelation value R(m) with every bit of the input data while feeding the result of calculation to the data rate decision 305. For example, if the code data or frame data have 2.4 ksps data repeated eight consecutive times, then the peak value of the function R(m) will appear at R(0), R(32), R(96), R(128), R(192), R(224), R(288), and R(320), as shown in FIG. 6.

The decision 305 counts the peak values of the frame data, e.g., eight peak values in the illustrative case. Then, the decision 305 determines that the data have the rate of 2.4 ksps, and feeds the result of decision to the Viterbi decoder 303 and speech decoding section. Likewise, if the number of peak values is four, the decision 305 reports the decoder 303 and speech decoding section that the data have the rate of 4.8 ksps. Further, if the number of peak values is two or one, the decision 305 reports them that the data rate is 9.6 ksps or 19.2 ksps.

In parallel with the above processing, the deinterleaver 301 writes in and then reads out the frame data with a procedure opposite to the interleave procedure executed at the transmitter. As a result, symbols arranged in the original sequence are output from the deinterleaver 301 and fed to the data accumulator 302. The data accumulator 302 accumulates, the number of times determined by the output of the data rate decision 305, the bits of the symbols sequentially applied thereto from the deinterleaver 301. Consequently, the 19.2 ksps data are restored to the original 2.4 ksps, 4.8 ksps, 9.6 ksps or 19.2 ksps symbols and then input to the Viterbi decoder 303.

The Viterbi decoder 303 decodes the input symbols at the same encoding rate as at the transmitter, e.g., ½ by the Viterbi decoding scheme. This transforms each of the two-bit one-symbol data to bit-by-bit code data and thereby reproduces each symbol as code data whose data rate is 1.2 kbps, 2.4 kbps, 4.8 kbps, or 9.6 kpbs.

After the tail bits have been removed from the code data undergone Viterbi coding, a part of the codes having the data rate of 4.8 kbps or 9.6 kbps is subjected to error correction using the CRC code. Then, this part of the codes is applied to the speech decoding section after the removal of the CRC code. On the other hand, the data having the data rate of 1.2 kbps or 2.4 kbps are directly applied to the speech decoding section. Consequently, all the code data having the rates of 1.2 kbps through 9.6 kbps are decoded and output as the original speech signals.

As stated above, the data receiver of the embodiment calculates autocorrelation values R(0) through R(383) with each frame of data before the data are deinterleaved, determines the data rate of the baseband signal of the received data on the basis of the calculated autocorrelation values, and then executes data thinning and Viterbi decoding in matching relation to the determined data rate. The receiver is, therefore, capable of adequately decoding the received data with a single data thinning and Viterbi decoding procedure. This effectively decodes the received data in a short period of time without resorting to a buffer great enough to accommodate a plurality of frames. Hence, the receiver can be provided with an inexpensive and miniature configuration.

Figure 8:
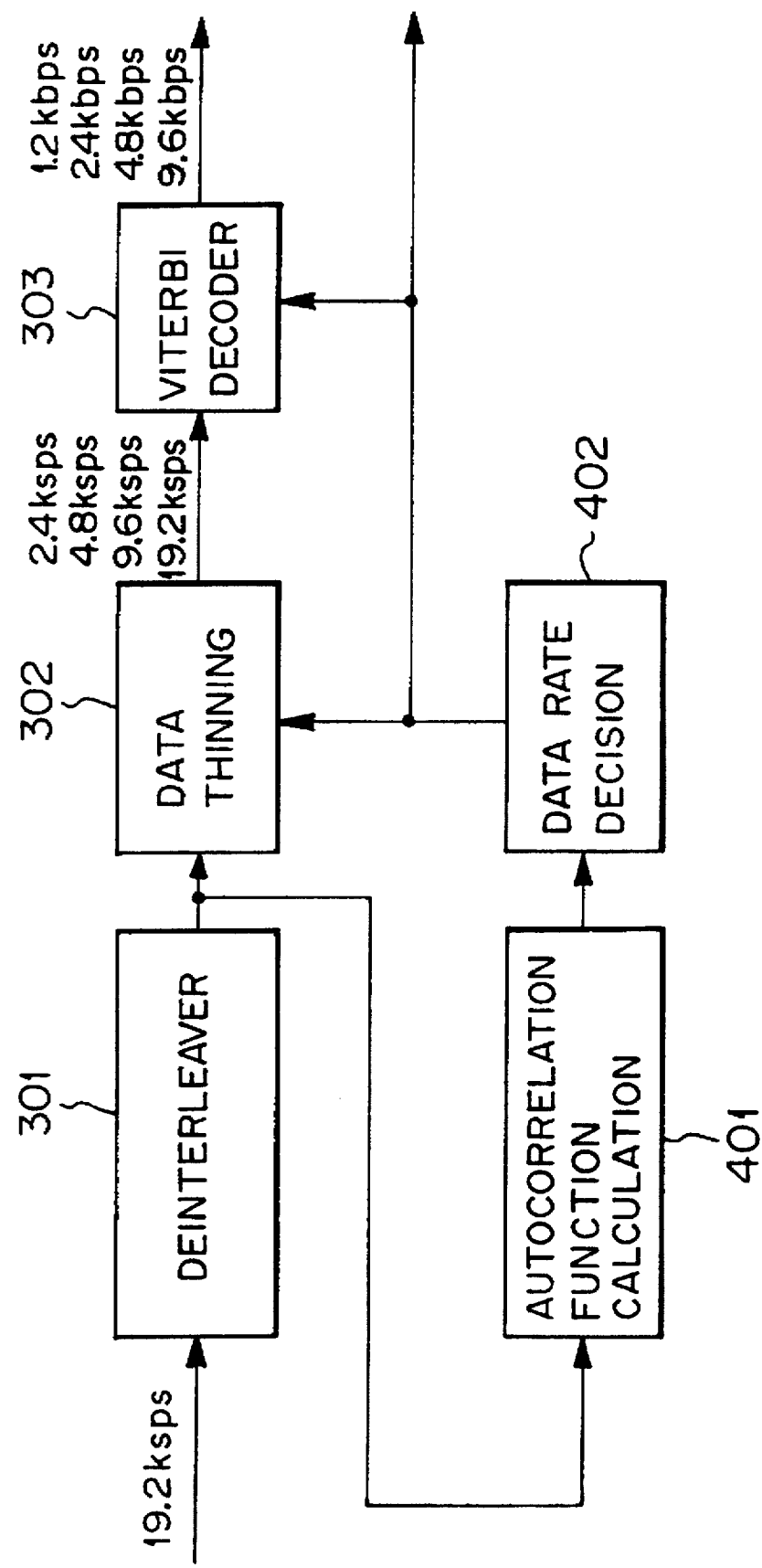
FIG. 8 is a schematic block diagram showing an alternative embodiment of the present invention.

Referring to FIG. 8, an alternative embodiment of the data receiver in accordance with the present invention will be described. In FIG. 8, the blocks like the blocks shown in FIG. 1 are designated by the same reference numerals, and a detailed description thereof will not be made in order to avoid redundancy. Briefly, while the previous embodiment calculates the autocorrelation functions of one frame of data before the data are subjected to deinterleaving, the embodiment to be described calculates them after the data have been subjected to deinterleaving. Specifically, this embodiment differs from the previous embodiment in that an autocorrelation function calculation 401 calculates only the autocorrelations of eight leading symbols of one frame, i.e., the values R(0) through R(7), and that a data rate decision 402 determines a data rate on the basis of the gradient of a peak waveform.

Figure 9:
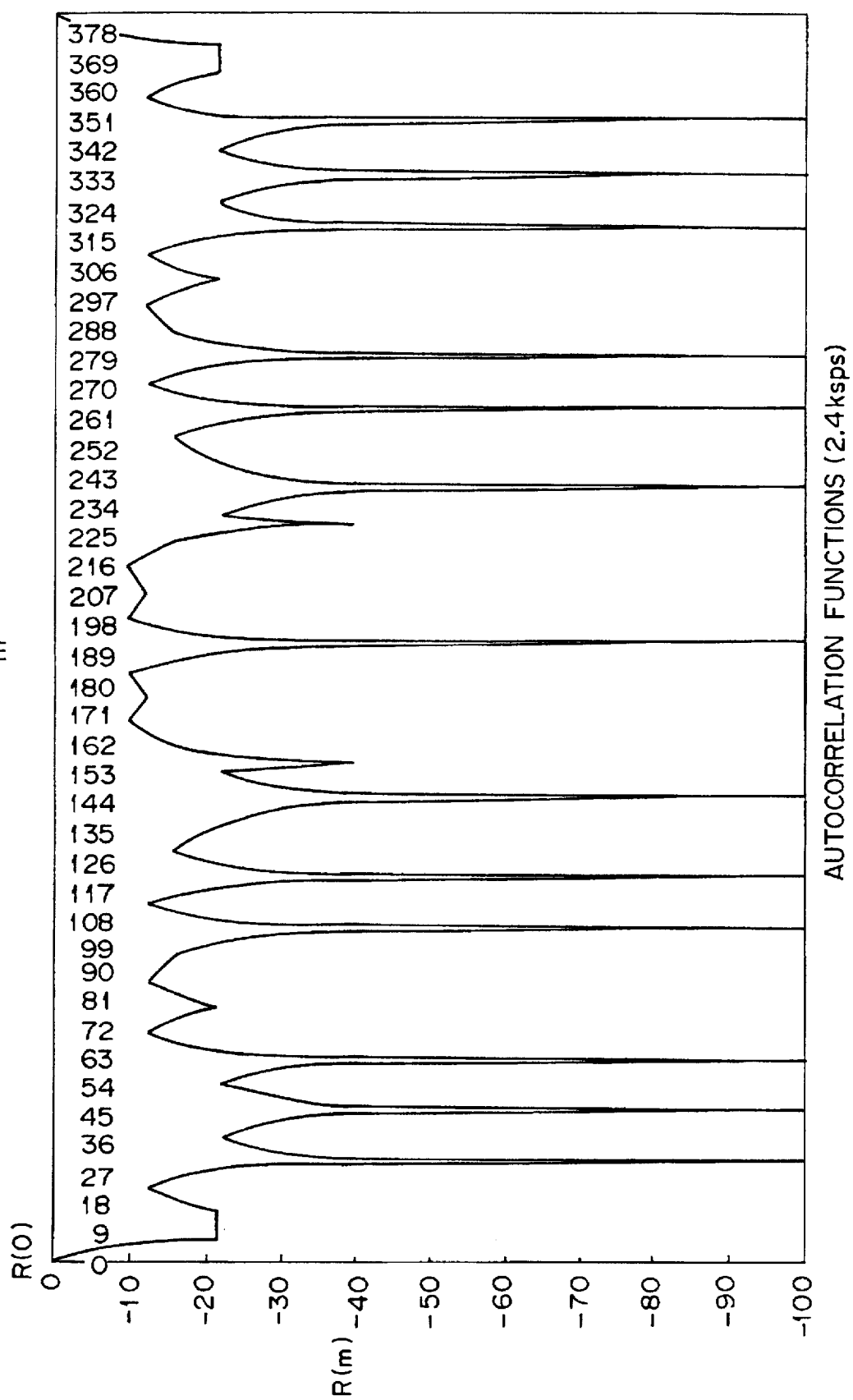
FIG. 9 shows specific autocorrelation functions of frame data received in the alternative embodiment and having the data rate of 2.4 ksps.

More specifically, the autocorrelation function calculation 401 outputs autocorrelation values R(m) shown in FIGS. 9 and 10 by way of example. FIGS. 9 and 10 are respectively representative of autocorrelation values R(m) particular to the 2.4 ksps rate data and autocorrelation values (Rm) particular to the 4.8 ksps rate data. As shown, whether the data rate be 2.4 ksps or 4.8 ksps, one frame of received data undergone deinterleaving include only one peak autocorrelation value R(0), as determined by experiments. In this case, therefore, it is impossible to determine a data rate by detecting peak values. However, a peak waveform representative of the consecutive autocorrelation values R(0), R(1) and so forth of several symbols has a gradient which differs from one data rate to another data rate. That is, the peak waveform has a sharper gradient when the data rate is 4.8 ksps than when it is 2.4 ksps. This tendency becomes more prominent with an increase in data rate.

In light of the above, the data rate decision 402 of this embodiment determines the gradient of a peak waveform on the basis of the autocorrelation values R(m) output from the calculation 401, thereby producing a data rate particular to the baseband signal of the received data.

The peak waveform is represented by the autocorrelation values of substantially eight leading symbols of one frame, i.e., R(0) through R(7). Stated another way, the peak waveform is represented by the autocorrelation values having variables m ranging substantially from 0 to 7. Paying attention to this, the calculation 401 may advantageously calculate the autocorrelation values of eight leading symbols of one frame, instead of calculating the autocorrelation values of all the symbols of one frame.

This embodiment, like the previous embodiment, is capable of effectively decoding received data in a short period of time without resorting to a data buffer. In addition, because the embodiment calculates the autocorrelation values of received data undergone deinterleaving, it can effectively determine the data rate of the baseband signal of the received data in a short period of time by measuring the gradient of a peak waveform. With this kind of scheme, it is possible to determine a data rate simply by calculating the autocorrelation values of only eight leading symbols of one frame. This successfully reduces the amount arithmetic operation for the calculation of autocorrelation values, compared to the case wherein the autocorrelation values of all the symbols of one frame are calculated.

Another alternative embodiment of the present invention will be described hereinafter. The alternative embodiment described above calculates the autocorrelation values of eight leading symbols of one frame. However, data values constituting one frame are apt to vary due to noise and channel conditions. If the eight leading symbols of one frame are influenced by noise or channel conditions, then the data receiver will fail to determine data rates with accuracy.

The autocorrelation functions of received data are symmetrical with respect to R(0), as indicated by the Eq. (2). Paying attention to this, the embodiment replaces the autocorrelation values of several leading symbols with a mean value of the gradient of the autocorrelation values R(m) of several leading symbols of one frame and the gradient of the autocorrelation values R(m) of several trailing symbols of the same frame. Specifically, the embodiment produces the autocorrelation values R(1) through R(7) of the second symbol (m=1) through the eighth symbol (m=7), produces the autocorrelation values R(383) through R(377) of the 383rd symbol through the 377th symbol (m=376), and then produces a mean value of the resulting two gradients. For example, for the second symbol of a given frame, the embodiment produces a mean value of the autocorrelation value R(1) of the second symbol and the autocorrelation value R(383) of the second symbol from the last.

With the above mean value scheme, the data receiver is capable of determining a data rate with a minimum of fall of accuracy even when the eight leading symbols of data in one frame are effected by noise and/or channel conditions, so long as the seven trailing symbols of data are not effected thereby.

In summary, in accordance with the present invention, a data receiver calculates the values of an autocorrelation function particular to each-frame of received data, determines, based on the calculated values, a data rate assigned to the frame before data repetition, and then thins or reduces the data of the frame in matching relation to the determined data rate. Hence, the receiver is capable of decoding the received data with a single data thinning procedure. This makes it possible to decode the received data in a short period of time without resorting to a data buffer.

While the present invention has been described with reference to the particular illustrative embodiments, it is not to be restricted by the embodiments. It is to be appreciated that those skilled in the art can change or modify the embodiments without departing from the scope and spirit of the present invention. For example, the embodiment shown in FIG. 1 calculates the autocorrelation values R(0) to R(383) of one whole frame. Alternatively, the autocorrelation function R(m) may be calculated only at and around the points where peak values appear, because such points are substantially constant. This will noticeably reduce the amount of arithmetic operation, compared to the embodiment of FIG. 1.

The embodiment shown in FIG. 8 is configured to produce the autocorrelation values of the first to eighth symbols of one frame. However, the autocorrelation values of seven or less symbols may be calculated if the gradient of a peak waveform can have its characteristic extracted. For example, only the autocorrelation values of the first to sixth symbols may be produced. This may even be applied to the second and successive leading symbols in place of the first to sixth symbols. Moreover, the autocorrelation values of the symbols may be calculated in an intermittent fashion. Any one of these modifications also holds true with the embodiment which uses a mean value of several leading symbols and several trailing symbols.

While the embodiment of FIG. 8 produces the autocorrelation values of several leading symbols of one frame, the several leading symbols may be replaced with several trailing symbols belonging to the same frame, if desired. This is because a data rate can be determined on the basis of the size of the gradient of a peak waveform which appears in the next frame.

Although the embodiments have concentrated on the receiver of a mobile station belonging to a CDMA cellular mobile communication system, the present invention is practicable with any other kind of data receiver so long as it receives data having a variable data rate and subjected to repetition for implementing predetermined data rates. Why this can be done is that the present invention executes data thinning and other steps efficiently by automatically determining a data rate assigned to received data before repetition. Hence, the prevent invention is, of course, applicable even to a data receiver of the type receiving data not subjected to block interleaving, convolutional coding, or spreading.

What is claimed is:

1. A data receiver for receiving code data having a variable data rate and encoded with any one of a plurality of data rates and then repeated in accordance with the respective data rates to be provided with a same data rate thereby, and for restoring, frame by frame, the code data received to data having original data rates, said data receiver comprising:

data rate detecting means for sequentially receiving one frame of the code data having the same data rate at a time, and detecting the data rate of the one frame of the code data assigned before repetition of the code data;

data rate restoring means for restoring, based on the data rate detected by said data rate detecting means, the one frame of the code data to the data having the original data rate; and data reproducing means for reproducing an original signal out of the code data restored by said data rate restoring means;

said data rate detecting means comprising:

calculating means for calculating autocorrelation functions of the one frame of the code data to thereby determine how many times the code data have been repeated; and deciding means for determining the data rate of the one frame of the code data assigned before the repetition on the basis of a characteristic of the data rate in the autocorrelation functions;

said data rate restoring means and said data reproducing means each performing respective processing on the basis of the data rate determined by said deciding means.

2. A data receiver in accordance with claim 1, wherein each frame of the received code data have been repeated and then subjected to block interleaving to be rearranged in the same frame thereby, wherein said calculating means calculates the autocorrelation functions of each frame of the code data before the coded data are subjected to deinterleaving opposite in procedure to the block interleaving, and wherein said deciding means decides the data rate of the code data on the basis of, among the autocorrelation functions calculated, the autocorrelation functions having a preselected value.

3. A data receiver in accordance with claim 2, wherein said calculating means calculates the autocorrelation function of all the code data included in each frame.

4. A data receiver in accordance with claim 2, wherein said calculating means calculates the autocorrelation function of only a part of the code data of each frame around a peak value.

5. A data receiver in accordance with claim 1, wherein each frame of the received code data have been repeated and then subjected to block interleaving to be rearranged in the same frame thereby, wherein said calculating means calculates the autocorrelation functions of preselected several code data of each frame around a beginning of the frame after the code data have been subjected to deinterleaving opposite in procedure to the block interleaving, and wherein said deciding means decides the data rate of the code data on the basis of a gradient of the autocorrelation functions calculated.

6. A data receiver in accordance with claim 5, wherein said calculating means calculates the autocorrelation function of a predetermined number of consecutive leading code data including first code data.

7. A data receiver in accordance with claim 5, wherein said calculating means calculates the autocorrelation function of a plurality of leading code data except for first code data.

8. A data receiver in accordance with claim 5, wherein said calculating means intermittently calculates the autocorrelation function of a plurality of code data, the code data adjoining a beginning of the frame first.

9. A data receiver in accordance with claim 1, wherein each frame of the received code data have been repeated and then subjected to block interleaving to be rearranged in the same frame thereby, wherein said calculating means comprises first calculating means for calculating first autocorrelation functions of a preselected number of code data of each frame adjoining a beginning of the fame, and second autocorrelation functions of a preselected number of code data adjoining an end of the frame, and second calculating means for calculating a mean value of the first and second autocorrelation functions, and outputting the mean value, and wherein said deciding means determines the data rate of the code data on the basis of a gradient of the autocorrelation functions calculated by said calculating means.

10. A data receiver in accordance with claim 9, wherein said calculating means calculate the autocorrelation functions of a plurality of leading code data of each frame except for a first code data, and the autocorrelation functions of a plurality of trailing code data of the frame except for last code data.

11. A data receiver in accordance with claim 9, wherein said calculating means intermittently calculates the autocorrelation functions of a plurality of code data adjoining a beginning of each frame, and the autocorrelation functions of a plurality of code data adjoining an end of the frame.

12. A data receiver in accordance with claim 1, wherein each frame of the received code data comprise code data subjected to convolutional coding and then the repetition, and wherein said data reproducing means comprises Viterbi decoding means for Viterbi decoding symbols restored to the original data rate on the basis of the data rate output from said deciding means.

13. A data receiver in accordance with claim 1, wherein each frame of the received code data comprise code data produced by encoding a speech signal by a speech encoding system, and wherein said data reproducing means comprise speech decoding means for decoding the code data having the variable data rate in accordance with the data rate particular to the code data.

14. A data receiver in accordance with claim 1, wherein each frame of the received code data comprise code data spread in spectrum, and wherein said data receiver further comprises inversely spreading means for inversely spreading the code data in spectrum and restores the code data to the data of the original data rate with a baseband signal inversely spread.

* * * * *